United States Patent [19]

Thompson

[11] 3,725,606

[45] Apr. 3, 1973

[54] ROTATING MAGNETIC TAPE HEAD HAVING AIR CUSHION SUPPORT FOR THE TAPE

[75] Inventor: Kenneth C. Thompson, Denver, Colo.

[73] Assignee: Electronic Processors, Inc., Englewood, Colo.

[22] Filed: May 17, 1971

[21] Appl. No.: 143,958

[52] U.S. Cl.........179/100.2 P, 179/100.2 T, 226/184

[51] Int. Cl.............................G11b 5/60, G11b 5/52

[58] Field of Search.......179/100.2 T, 100.2 P, 100.2 PM; 226/184, 191

[56] References Cited

UNITED STATES PATENTS

| | | | |
|---|---|---|---|
| 3,047,673 | 7/1962 | Springer | 179/100.2 T |
| 3,614,338 | 10/1971 | Bogels | 179/100.2 P |
| 3,524,607 | 8/1970 | Furst | 226/191 |
| 3,024,319 | 3/1962 | Roberts | 179/100.2 T |
| 3,244,818 | 4/1966 | Bick | 179/100.2 T |
| 3,446,410 | 5/1969 | Brose | 226/191 |

*Primary Examiner*—Bernard Konick
*Assistant Examiner*—Jay P. Lucas
*Attorney*—Dugger, Peterson, Johnson & Westman

[57] ABSTRACT

A rotating head structure used in magnetic tape recorders such as those for storing digital data. The head assembly has a tape guiding groove and one or more recording and/or playback heads and is rotated so as to move the heads relative to the tape. The tape guiding groove is generally V-shaped in cross section and is narrower than the tape width along the inner portions of the grooves. As the head rotates air is carried along in the groove and the tape tends to float on an air cushion.

5 Claims, 3 Drawing Figures

INVENTOR
KENNETH C. THOMPSON
BY Dugger, Peterson, Johnson & Westman

ROTATING MAGNETIC TAPE HEAD HAVING AIR CUSHION SUPPORT FOR THE TAPE

BACKGROUND OF THE INVENTION

The Philips type magnetic tape cassette has enjoyed great success in audio recording applications. Because of its convenience and ease of handling, it has also been used in a number of digital data recorders; for example, of the type used as auxiliary storage devices for small digital computers. In the recording and playback of digital data, it may be desirable to record and play back a short section of tape over and over again or merely record a short section of tape over and over, or play back a short section of tape over and over. The tape is usually held stationary and a head moved across the tape operating in this manner, the tape of an individual cassette may be worn out within a relatively short time. In the recording of digital data, it also is generally desirable to verify that the correct data has actually been recorded upon the tape. If data is first recorded and then correctly read back, the likelihood is extremely high that it will be possible to again read the correct data at some later time. If this read after write verification is not performed, there is some likelihood that defects in the tape and/or other causes may have prevented the recording of valid data. Also, one of the significant mechanical problems in the design of a cassette type tape transport unit for digital data recording is insuring uniform motion of the tape past the record or playback head.

SUMMARY OF THE INVENTION

The present invention relates to a rotating head assembly for recording or playing back information on magnetic tape. The tape passes partially around the rotating head assembly and is held stationary during use of the head. The geometry and rotation speed of the head assembly is arranged so as to provide an air film under the tape which will slightly space the tape from the head and greatly reduce contact and wear of both the tape and the head assembly. The rotating head assembly is particularly convenient for a "read" after "write" verify, as the verify read may be performed without the need for repositioning the tape.

In a preferred form of the present invention, the tape is guided by a generally V-shaped groove formed by side surfaces that converge toward the axis of rotation of the head to a width narrower than the width of the tape. Air is carried with the head and the tape will then tend to float on an air cushion, slightly spaced from the rotating head assembly. The edges of the tape will be in close proximity to the side surfaces of the guiding groove, thereby inhibiting the escape of the cushioning air.

DESCRIPTION OF THE INVENTION

Figure 1:
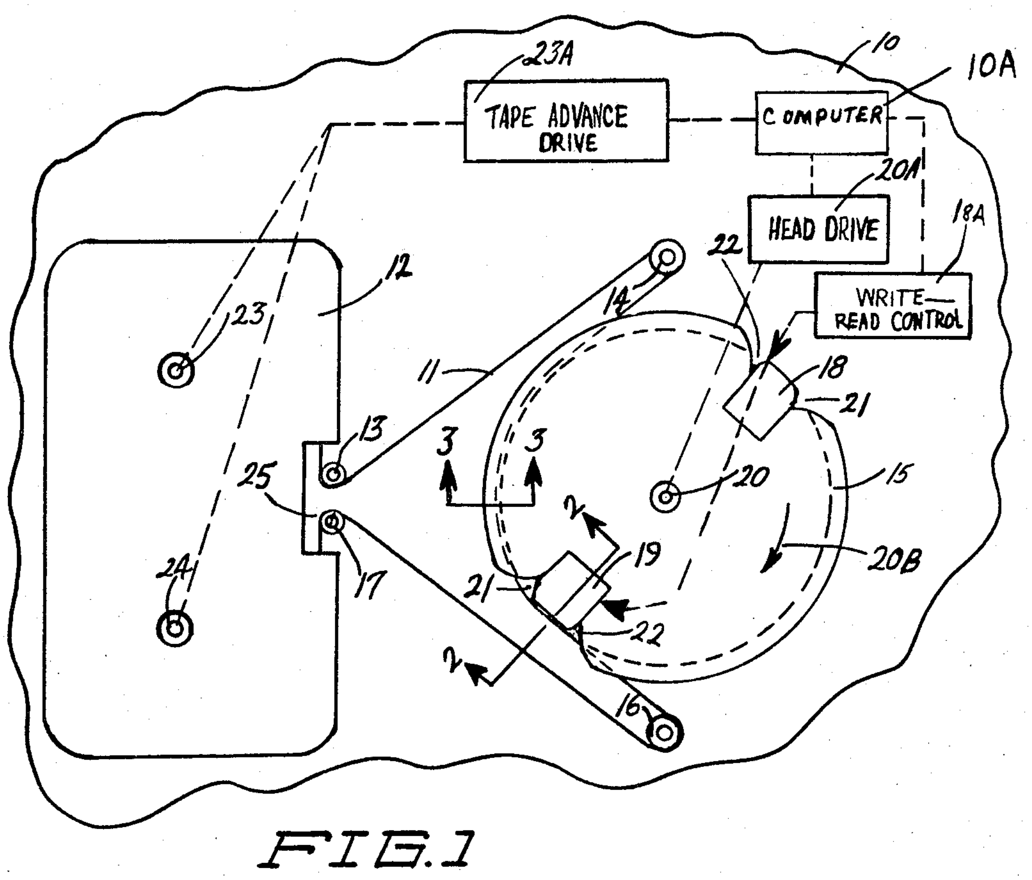
FIG. 1 is a schematic illustration showing the arrangement of a tape cassette, tape and a rotating head assembly of a preferred form of the invention.

Referring now to the drawings: FIG. 1 shows a recorder 10 utilizing a magnetic tape 11 which has been pulled out from tape cassette 12 to form a large loop of tape. The tape 11 passes from one reel of cassette 12 around roller 13, to roller 14, then around a portion of the periphery of a rotating head assembly 15 and to roller 16, then to roller 17 and back into cassette 12. The rollers rotate about axes parallel to the axis of rotation of head 15. A first signal recording or reproducing (read or write) head 18 and a second signal recording and reproducing head 19 are mounted on head assembly 15 substantial 180° apart. The head assembly 15 has a peripheral groove 27 formed therein and defined by converging side surfaces or walls. The groove 27 extends between the heads 18 and 19. The head assembly is drivably mounted on a shaft 20 which is driven by a motor or head drive 20A in direction indicated by the arrow 20B. Small gaps 21 and 22 on either side of heads 18 and 19 carry air ahead of the heads and this air comes in contact with tape 11 for the purpose of forming an air cushion for tape 11 as the head 18 and 19 pass by the tape, and also between the tape and the portions of assembly 15 which are adjacent the tape. Tape 11 may be positioned with the desired section of the tape adjacent the head by driving hub 23 or hub 24 of cassette 12. Cassette 12 is a generally standard Philips type cassette, except for a slot 25 which is cut into the cassette body and allows tape 11 to be more readily pulled out of the cassette and around the rollers 14 and 16 and head assembly 15.

The details of the electrical connections to recording heads 18 and 19, are the means for driving head assembly 15 and the means for driving hubs 23 and 24 and positioning tape 11 are shown schematically in the figures. Such means may be conventional and are well known, for example, those used on rotating head cassette type video tape recorders of the types which are now available as standard commercial products. The heads 18 and 19 may be made to read data from the section of tape 11 adjacent the head assembly in response to control signals from controls 18A and the tape advance drive 23A may also be initiated and stopped by signals from these controls. A computer 10A may be used to initiate all command responses.

A head assembly of approximately 2 inches diameter and a rotation speed of two turns per second has been found to give sufficient air movement to provide the necessary air cushion to give the desired gap between the tape 11 and the heads 18 and 19.

Figure 2:
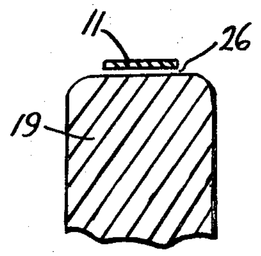
FIG. 2 is a detailed sectional view illustration showing the passage of the magnetic tape over a record playback head of the structure of FIG. 1.

FIG. 2 illustrates the passage of tape 11 across head 19. As may be seen in FIG. 2, tape 11 is lifted slightly off of head 19 by air of air film 26 which is pulled in between tape 11 and head 19 at gap 21.

Figure 3:
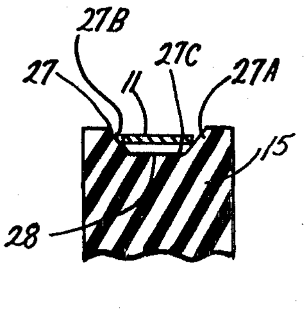
FIG. 3 is a detailed illustration showing the passage of the tape through the tape guiding groove of the rotating head assembly of FIG. 1.

FIG. 3 illustrates the position of tape 11 in relation to groove 27 of the body of head assembly 15. A standard cassette tape is 0.150 inches wide. The slopes of the converging side walls of groove 27 were approximately 45 degrees, measured from the rotation plane of head assembly 15. The surface 27C defining the bottom of groove 27 in the form shown is 0.125 inches wide. The surface 27C was flat, as shown. Thus, tape 11 tends to contact only the side surfaces 27A and 27B of groove 27, preventing the outflow of air and forming air film 28 between tape 11 and the surfaces of head assembly 15 defining groove 27.

The heads 18 and 19 are fastened in head assembly 15 in any desired manner and protrude radially outwardly a short distance farther than the bottom surface 27C of the slot 27. The heads therefore tend to carry air along with them to provide the air film supporting the tape. The relief areas 21 and 22 permit air to enter the groove.

What is claimed is:

1. In a magnetic tape recording and reproduction system utilizing a length of magnetic recording tape, a rotating head assembly including a head member which moves relative to said length of tape as the head assembly rotates, a peripheral tape guiding groove defined in said rotating head assembly, said length of tape being positioned in said groove, said groove being formed by side surfaces converging toward each other in direction toward the axis of rotation of said head assembly to a width less than the minimum width of said length of tape, and means to rotate said head assembly at a speed whereby the head assembly carries a layer of air between the length of tape and the bottom of said groove across substantially the entire width of said tape.

2. The combination of claim 1 in which said groove has a flat bottom surface extending between the side surfaces, the width of said bottom surface being less than the width of the tape used in the system.

3. The combination of claim 2 wherein said head member protrudes radially outwardly beyond said bottom surface and is aligned with said groove.

4. The combination of claim 3 and relief passageways opening to said groove adjacent at least one side of said head member.

5. The combination of claim 1 including a tape supply providing said length of tape, and means to guide said length of tape from said supply to position said tape in said groove for a preselected distance around the periphery of said rotating head assembly.

* * * * *